United States Patent [19]

Kamiyama et al.

[11] Patent Number: 5,046,703

[45] Date of Patent: Sep. 10, 1991

[54] CARBONACEOUS SINTERED COMPACT AND FLUID SEALING MEMBER WITH THIS CONTACT

[75] Inventors: Minehiro Kamiyama, Zentsuji; Takashi Matsumoto, Kagawa; Yoshihiro Watanabe, Osaka, all of Japan

[73] Assignee: Toyo Tanso Co., Ltd., Osaka, Japan

[21] Appl. No.: 544,805

[22] Filed: Jun. 28, 1990

Related U.S. Application Data

[63] Continuation of Ser. No. 274,548, Nov. 22, 1988, abandoned.

[30] Foreign Application Priority Data

Nov. 24, 1987 [JP] Japan .................................. 62-297202

[51] Int. Cl.$^5$ .............................................. F16K 31/44
[52] U.S. Cl. .................................... 251/368; 251/148; 251/214
[58] Field of Search ............... 251/368, 148, 304, 315, 251/316, 305, 152, 214; 29/157.1 R

[56] References Cited

U.S. PATENT DOCUMENTS

| | | | |
|---|---|---|---|
| 3,592,440 | 7/1971 | McFarland | 251/315 |
| 4,006,881 | 2/1977 | Gaillard | 251/368 |
| 4,269,391 | 5/1981 | Saito et al. | 251/368 |
| 4,424,953 | 1/1984 | Takasi et al. | 251/368 |
| 4,546,737 | 10/1985 | Kazuoka et al. | 251/368 |
| 4,647,013 | 3/1987 | Giachino et al. | 251/368 |
| 4,662,392 | 5/1987 | Vadasz | 251/368 |
| 4,671,491 | 6/1987 | Kuroishi et al. | 251/368 |
| 4,765,592 | 8/1988 | Minai | 251/315 |

FOREIGN PATENT DOCUMENTS 56486 3/1984 Japan .

OTHER PUBLICATIONS

"High Density Isotropic Carbon Blocks KMFC Made From Coal Tar Pitch"; Kawasaki Steel, Technical Report No. 16, June 1987.

Primary Examiner—A. Michael Chambers
Attorney, Agent, or Firm—Armstrong, Nikaido, Marmelstein, Kubovcik & Murray

[57] ABSTRACT

A heat resistant fluid sealing member comprising an annular slide contact member of impermeable carbonaceous material whose raw material is mesocarbon microbeads.

9 Claims, 8 Drawing Sheets

CARBONACEOUS SINTERED COMPACT AND FLUID SEALING MEMBER WITH THIS CONTACT

This application is a continuation of application Ser. No. 274,548 filed Nov. 22, 1988, now abandoned.

BACKGROUND OF THE INVENTION

1. Field of the invention

The present invention relates to a carbonaceous sintered compact, inter alia, to a sintered compact of graphite and mesocarbon microbeads for use in valve, ball joint and the like, and more particularly to an annular slide contact fluid sealing member which encloses fluid passage to seal fluid and is in contact with valve disc or inner cylinder, to be mainly used in association with annular contact sealing member which is in contact with valve casing or outer cylinder.

2. Prior art

Figure 1:
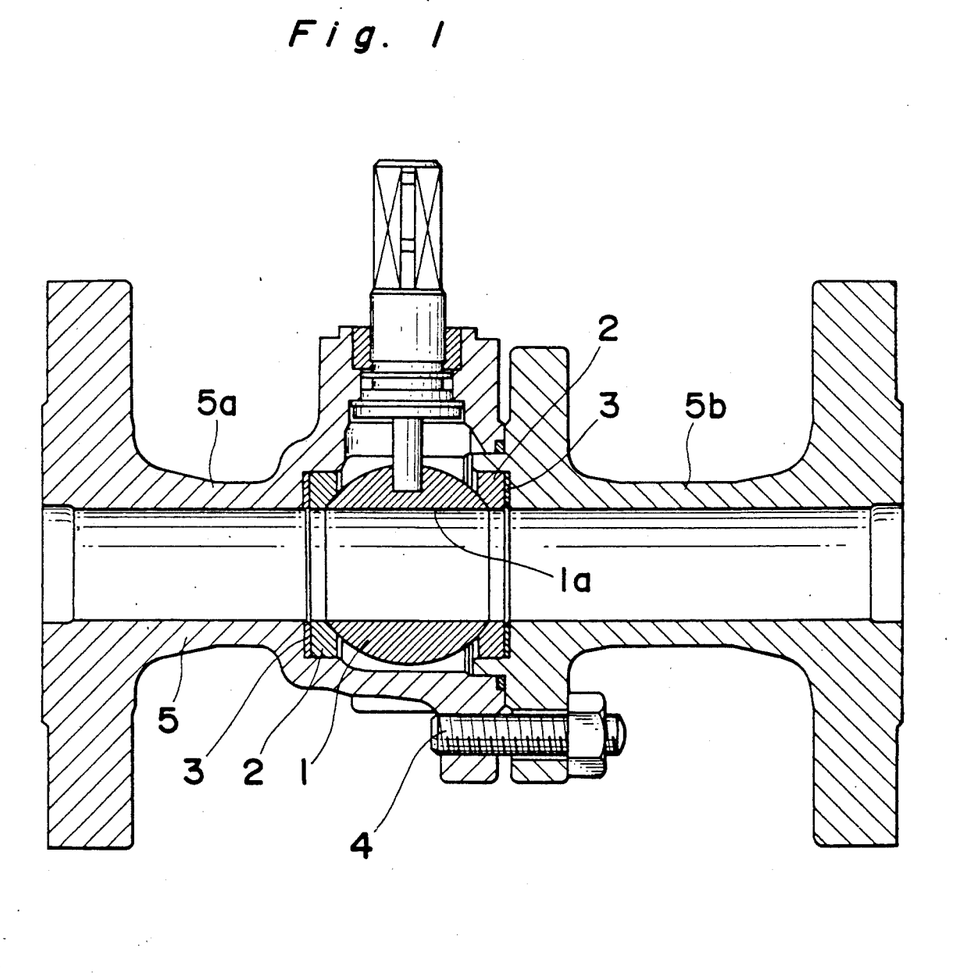
FIG. 1 shows a valve with a spherical valve disc.
Figure 2:
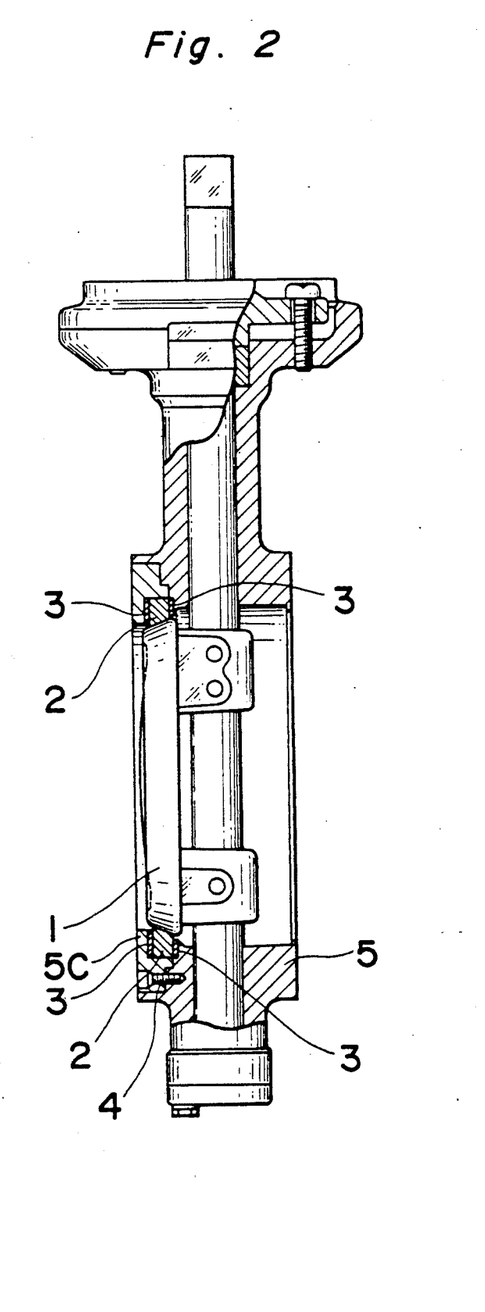
FIG. 2 shows a valve with a cylindrical valve disc and having a spherical surface on the vertical sliding contact section.

Several annular fluid sealing mechanisms such as valve seat of valve have been widely used heretofore. For example, as shown in FIG. 1 illustrating a partially enlarged view of a spherical valve and in FIG. 2 illustrating a ball joint section, there has been provided a fluid sealing mechanism comprising an annular sliding contact member (A) of such a rigid material as carbonaceous composite material or metal to perform sealing of fluid (gas or liquid) in tight contact with valve body being a movable section, and an annular contact sealing member B) which is disposed on the rear part between valve casing or outer cylinder and the annular sliding contact member (A) in contact with both of them to perform sealing in association with valve casing.

In the valve or joint of above construction, hard rubber, fluororesin, thermosetting resin, and composite material of any of them with inorganic material have been conventionally used as the sliding contact member (A).

Some of these materials can be satisfactorily used under relatively moderate conditions, and in fact some of them are actually used as sealing materials of valves, joints or the like. However, under the recent rapid progress of technology, the service conditions have been increasingly severe, and various problems are now identified.

For example, concerning the rubber material, deterioration thereof occurs at high temperature and brittleness occur at low temperature. Concerning the fluororesin material, dimensional change takes place resulting in incomplete sealing because of large thermal expansion coefficient in extremely low temperature range wherein LNG (liquefied natural gas) or liquid nitrogen is used as fluid. Moreover, when a valve or joint is exposed to a flame of several hundreds of degrees, another problem exists in that the material decomposes resulting in loss of its sealing function. To overcome these problems, several attempts have been proposed in which ceramics or carbon material is employed. However, ceramics are disadvantageous because ceramics are inferior in machinability although superior in heat resistance, difficult in fitting with joint face of valve disc resulting in insufficient sealing performance, and moreover are not very resistant to thermal shock.

Under such circumstances, other fluid sealing materials capable of being used under conditions of high temperature, extremely low temperature or high corrosion have been further proposed recently. That is, in the combination of valve components for sealing highly corrosive fluid, heat resistant or corrosion resistant metal is used as valve casing or valve disc, while composite of such metal with carbon material being used as sealing material.

Carbon material is certainly preferable because it resists temperatures high as 3000° C. and it is physically stable. The thermal expansion coefficient of carbon material is very small as compared with other materials and corrosion resistance thereof to chemical products is also satisfactory.

Conventional carbon materials, however, have several drawbacks. For example, carbon material generally has fine through pores and is therefore gas permeable. More specifically, conventional carbon materials are usually made by the steps of mixing coke, natural graphite, etc. with pitch, grinding, molding and baking it, and as a result of such steps, fine through pores are formed due to the escape of the volatile component of pitch, off gases, etc. In the production process thereof, it is usually intended to establish certain mixing and baking conditions of forming such fine through pores for the purpose of making use of such phenomenon in view of preventing the products from being broken into pieces in the baking step.

Existence of such fine through pores brings about low sealing performance as a matter of course.

To overcome the above drawbacks when using such conventional porous carbon material, several attempts have been proposed. For example, a sliding contact member formed of a composite material of carbon material and inorganic material was proposed as disclosed in Japanese Patent Publication (examined) No. 58-18554. The inorganic material used in this proposal is prepared by impregnation of at least one inorganic binder picked up among graphite oxide, boric acid and aluminum phosphate. A non ferrous metal whose melting point is 200°–1100° C. or composite of these material with alloy is also used as an inorganic material. In this proposed material, problems of fluid leaking through the fine pores are solved by impregnation with foreign material. Such inorganic material impregnated with foreign material or composite material closing the through pores of carbon material can prevent gas leak to a certain extent, but the following secondary problems arise:

(1) Material impregnated with metal and salt is easily corroded resulting in the decline of sealing performance and strength, with the passage of duration of service when in contact with fluids such as acid or alkaline chemical products.

(2) Since there is a large difference between the metal or salt and carbon material in terms of thermal expansion coefficient and heat conductivity, partial breakdown takes place due to such differences which eventually result in a decline of strength and sealing performance. In particular, when using a composite material of this kind in a valve or joint exposed to an extremely high temperature of not lower than 500° C. otherwise to an extremely low temperature of not higher than −100° C., such a problem will become serious by repeated use thereof.

(3) In the production of composite material prepared by above impregnation, production process is increased which, in turn, increases production cost.

SUMMARY OF THE INVENTION

The present invention was made to solve the above discussed problems of the conventional fluid sealing materials.

An object of the invention was to produce a fluid sealing material using certain carbonaceous raw materials which are free from the above-discussed problems.

Another object of the invention is to provide a highly superior carbonaceous material when used as the fluid sealing material.

A further object of the invention is to provide a carbonaceous sintered compact which is superior in its physical properties.

As a result of comparative studies of various materials to be used as an annular sliding contact member, it was found by the inventor that the foregoing objects can be accomplished by employing mesocarbon micro beads (hereinafter referred to as "MCMB") as a raw material, then molding, baking and graphitizing the MCMB, when required.

It was further found by the inventor that in a sintered compact obtained by mixing a graphite with MCMB, the frictional coefficiency thereof is remarkably low to be enough for an excellent sintered compact of low friction coefficient which is quite preferable when used as a fluid sealing member. Such a superiority is achieved for the following reason: Generally, MCMB itself is easily graphitized, but when producing a sintered compact of MCMB, MCMB is sintered with its array random and micro structure of the sintered compact does not have a regular layer formation. As a result, the frictional coefficient of the sintered compact of MCMB alone is not always small enough, and even when such a compact is further graphitized, the frictional coefficient still remains un-reduced. On the other hand, in a composite sintered compact of MCMB and graphite, it is expected that graphite layer is cleaved thereby reducing the frictional coefficient.

Described hereinafter is a fluid sealing member composed of MCMB.

The inventor coming to a novel idea of utilizing MCMB into a sealing member of this kind has been engaged in studying aptitude and feasibility thereof. As a result of the studies, it was found that this carbonaceous material is of highly dense structure having less pores and substantially no gas permeability, which is a preferable material suited for fluid sealing. As a result, being different from the conventional materials, there is no need for impregnating with foreign material, and neither breakdown due to difference in the thermal expansion coefficient between the carbon material and mixed or impregnated foreign material after repeated use under high or low temperature, nor leak of impregnation component and decline of sealing performance due to corrosive product takes place.

It was further found that the carbon material composed of MCMB is of high strength compared with the conventional carbon materials and exhibits a satisfactory lubrication property peculiar to carbon material. The afore-mentioned characteristics are summarized as follows:

(a) small frictional coefficient between the members in sliding engagement with one another;
(b) sufficient mechanical strength endurable to pressure applied to valve seat by valve disc and fluid;
(c) sufficient impermeability;
(d) sufficient resistance to chemical products;
(e) small and uniform thermal expansion coefficient capable of meeting rapid temperature change; and
(f) the foregoing characteristics can be kept over the wide temperature range from extremely low temperature to high temperature.

All of above characteristics represents mean that the carbon material according to the invention has an excellent characteristics for use as valve seat material.

The carbon material according to the invention can be prepared by baking the raw material MCMB after molding it into a required configuration. The carbon material can be also easily prepared by the steps of fabricating a large block-like product by compressing or baking the MCMB according to hydrostatic pressure application method and forming it into a final configuration by cutting. From the viewpoint of machining cost, the former method is practically adopted and although a configuration nearly the same as the final product can be already achieved in the step of molding by a precise mold, the molded product can be further finished by precise abrasion and filling of essential part and surface, if required.

Generally, material of high anisotropy is desired in view of cutting and surface finishing steps.

In this sense, the above carbon material of MCMB is quite satisfactory for the machining because of its anisotropy, being different from the conventional carbon materials.

Furthermore, material of high anisotropy is advantageous because of low thermal expansion coefficient and expansion uniform in all directions. Accordingly, such material of high anisotropic expands and contracts parallel in every direction together with a coupled complete anisotropic metal corresponding to temperature change of valve under operation. As a result, this carbon material can evenly follow the temperature change over the range of extremely high temperatures to extremely low temperatures, whereby fluid leak can be completely prevented by sealing therewith.

MCMB itself is a known material, and all MCMB conventionally known can be used in the invention.

One of the typical MCMB carbon materials can be prepared by heat-treating a pitch or a resin at 350°–450° C., thereby obtaining fine mesophased spheres, i.e., beads of several microns to several tens microns produced in a matrix. Size of the beads is different depending on temperature and time of heat treatment, but size is an important factor with regard to gas permeability of carbon material obtained by molding, baking and graphitizing, when required.

There are three preferable manners of using MCMB as raw material as follows:

(1) Using MCMB whose average grain size is not larger than 10 $\mu$m;
(2) Grinding MCMB whose average grain size is not smaller than 10 $\mu$m into MCMB whose average grain size is made not larger than 10 $\mu$m, then using it; and
(3) Promoting the growth of MCMB, grinding bulk-meso phase grains into MCMB whose average grain size is not larger than 10 $\mu$m, then using it.

In the carbon material obtained by molding, baking and graphitizing, when required, the above raw material according to customary method, no leakage was substantially found when 5 kg/cm$^2$ N$_2$ gas was applied to the material of 2 mm in thickness, thus a carbon material of 1000–1500 kg/cm$^2$ in bending strength and 90–120 in Shore hardness being obtained, which shows that the obtained material is quite suitable for a fluid sealing member.

In each of the steps of molding, baking and graphitizing, when required, means and conditions conventionally employed in this field of art are available.

BRIEF DESCRIPTION OF THE DRAWINGS

FIG. 16 shows microphotographs of sintered compacts of MCMB and graphite taken by a polarization microscope, and in which (A) is a microphotograph of a sintered compact including 5 wt % of graphite and (B) is that of a sintered compact including 10 wt % of graphite.

Each of the examples shown in the above drawings is now described more specifically hereunder. Referring first to FIG. 1, a ball (valve disc) (1) provided with through holes (1a) is rotatably held in a valve casing (5) comprising a body (5a) and a body cap (5b) secured by a fastening bolt (4), then an annular slide contact member (2) is mounted on stepped portions provided on both sides of the ball (1) in the valve casing (5) in such a manner as to be in contact with the surface of the ball (1), and further an annular sealing member (3) is provided between the valve casing (5) and the slide contact member (2), thus forming a valve seat for ball valve. The annular slide contact member (2) itself performs independently a of the valve seat and besides performs a function of valve seat in association with the annular slide contact member (2) and sealing member (3) as described above.

FIG. 2 shows an example of a butterfly valve, in which the annular slide contact member (2) and sealing member (3) are incorporated in the valve casing (5), and both members (2), (3) are fixedly fitted thereto by a fitting member (5C) through the bolt (4).

Figure 3:
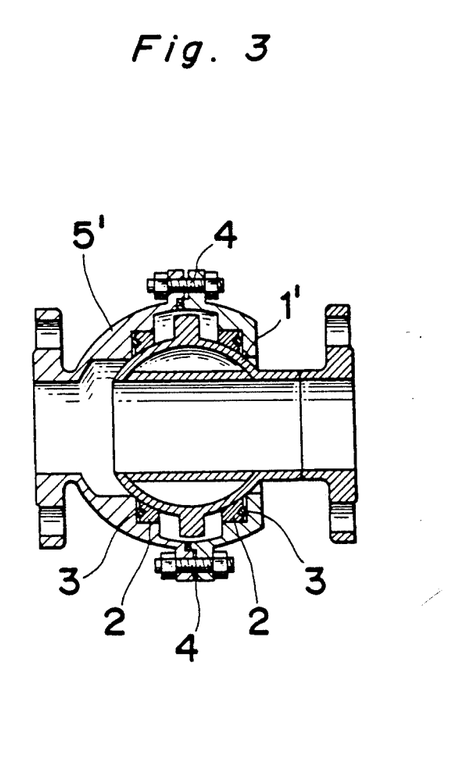
FIG. 3 shows a universal joint having a spherical sliding contact section.

FIG. 3 shows an example of ball joint, in which outer cylinders (5'), (5') are secured by the bolt (4), and the members (2), (3) are provided between inner cylinders (1') and outer cylinders (5').

Figure 4:
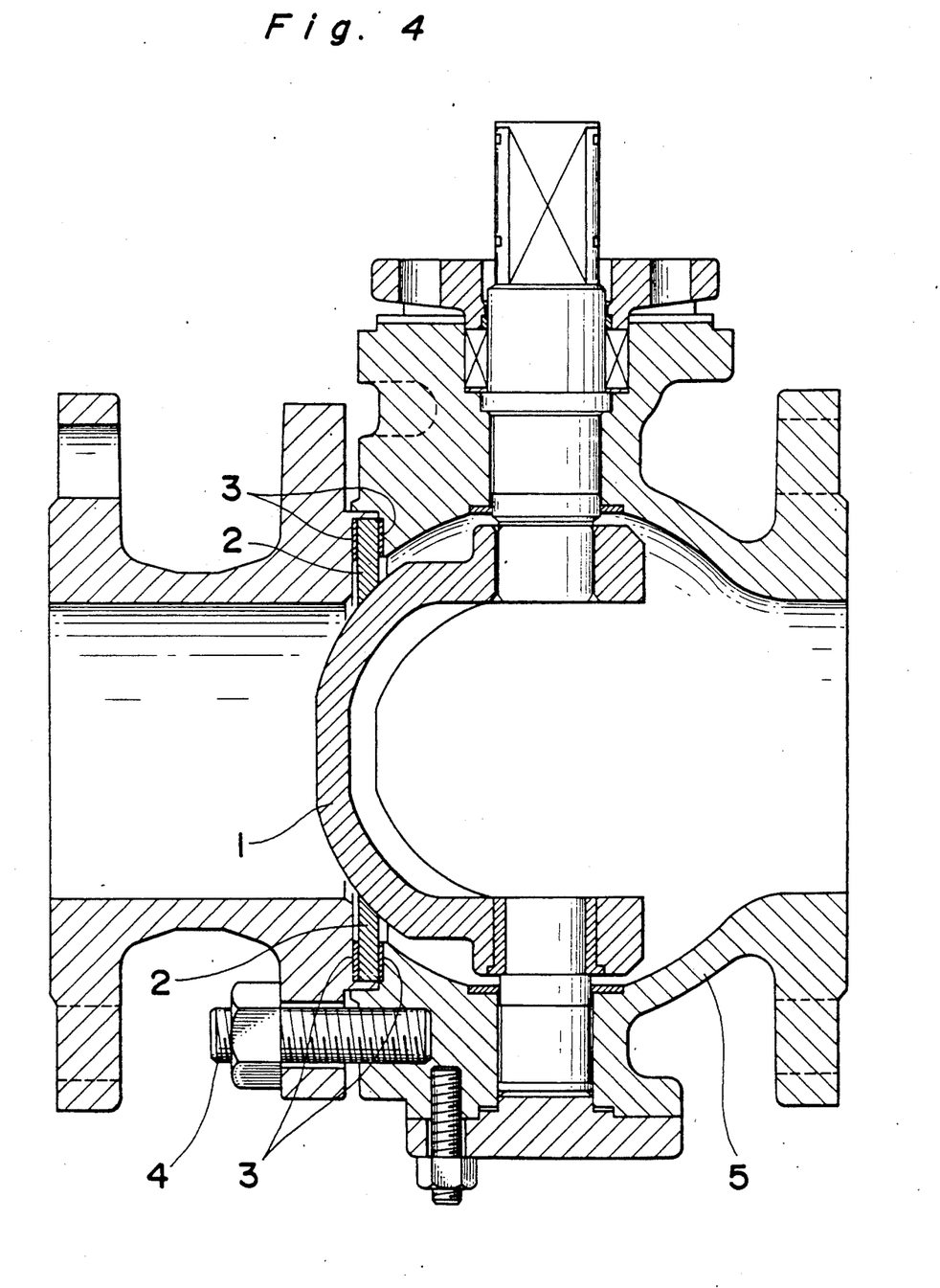
FIG. 4 shows a valve with a semispherical valve disc.
Figure 5:
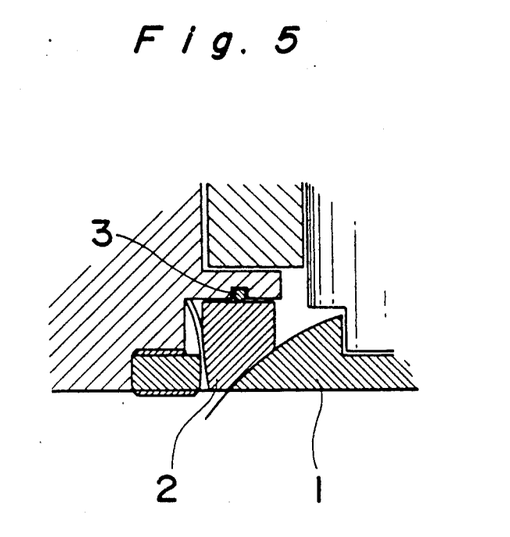
FIGS. 5 and 6 are enlargements which; show examples of fluid sealing sections used in valve, joint, etc. respectively.
Figure 6:
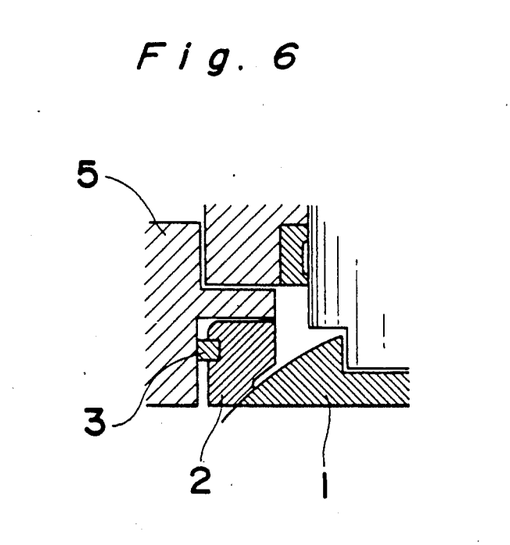
Figure 7:
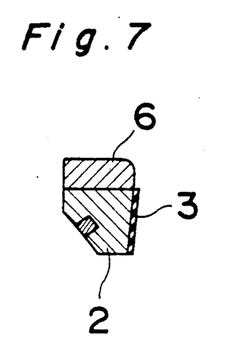
FIGS. 7 to 15 show examples of application of the fluid sealing member according to the present invention, respectively.
Figure 8:
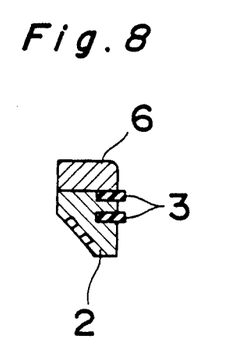
Figure 9:
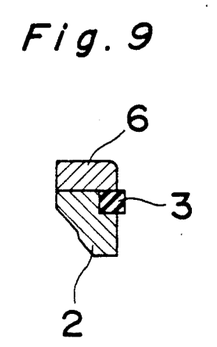
Figure 10:
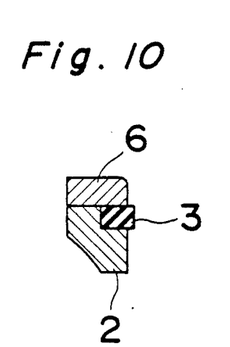
Figure 11:
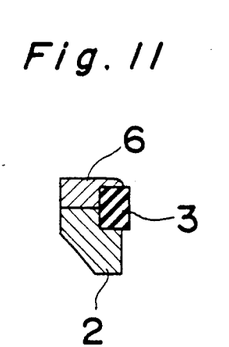
Figure 12:
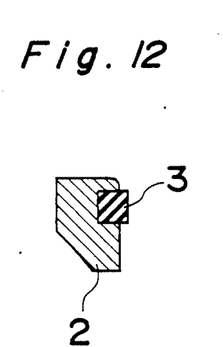
Figure 13:
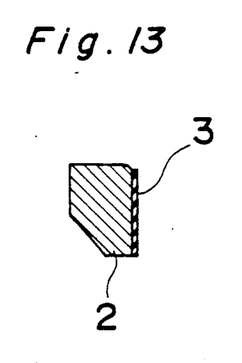
Figure 14:
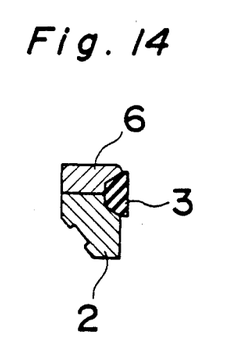
Figure 15:
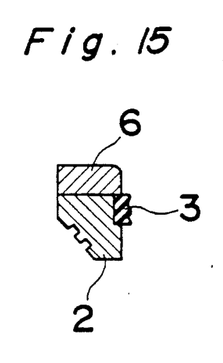

FIG. 4 shows an example of a semispherical ball valve.

FIGS. 5 to 15 show further examples, in which reference numeral (6) indicates an annular protection ring.

Figure 18:
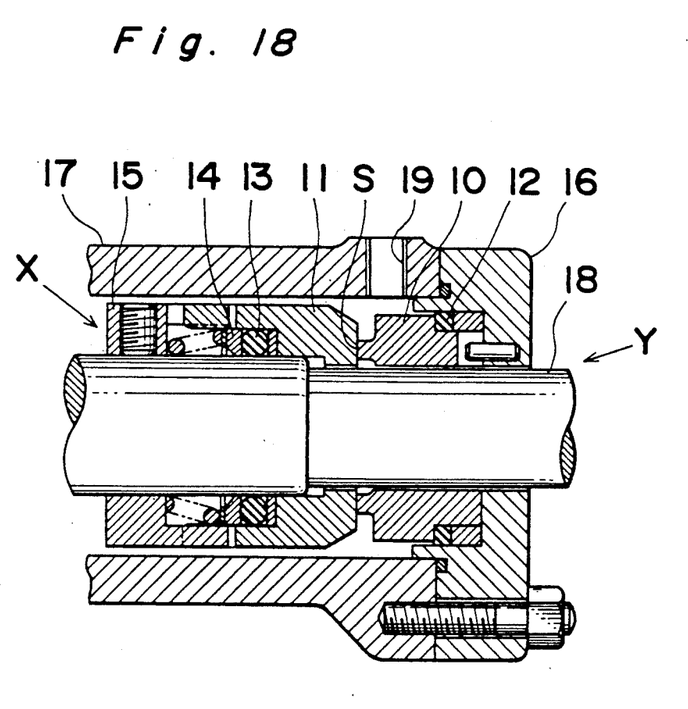
FIG. 18 shows an example in which the sintered compact according to the invention is applied to a mechanical seal.

In FIG. 18, indication by reference numerals is as follows:

10 ... sliding member
11 ... auxiliary ring
12 ... buffer ring
13 ... packing
14 ... compression ring
15 ... stopper
16 ... seal cover
17 ... stuffing box
18 ... shaft
19 ... flushing hole
S ... fluid-tight section
Y ... atmosphere
X ... sealed fluid As a matter of course, the fluid sealing material according to the invention can be applied not only to the foregoing examples shown in FIGS. 1 to 15 but also to other means for sealing fluid.

Describing the function mechanism with reference to the valve shown in FIG. 1, an annular slide contact member (2) is in close contact with a spherical valve disc (1) by the clamping force of a valve casing clamping bolt (4). Because of sufficient fitting arranged preliminarily between the components (2) and (1), there is no possibility of a fluid leak from this face.

Annular contact sealing member (3) is disposed between the annular slide contact member (2) and the valve casing (5) in such a manner that the annular contact sealing member (3) is compressed through the annular slide contact member (2) by the clamping force of the bolt, thereby the seal between them and the valve casing is perfect preventing fluid from leaking.

The invention particularly relates to the material of the annular slide contact member, and as described above, MCMB whose grain size is not larger than 10 $\mu$m is used as a raw material or MCMB is ground into grain size of not larger than 10 $\mu$m for use, then the sized MCMB is subjected to molding, baking and graphitizing, when required, without admixture of foreign material or impregnation as is done in the prior art. Accordingly a material is obtained which is fluid impermeable, chemical resistant, small in thermal expansion coefficient, large in mechanical strength, self-lubricating and endurable over the wide range from extremely low temperature to high temperature. In other words, the invention achieves heat resistance, chemical resistance, self-lubrication and gas sealing performance by a carbon material alone.

Described now is the sintered compact of MCMB and graphite according to the invention.

First, MCMB and graphite are evenly mixed, the MCMB being the one mentioned above.

In this respect, ground bulkmeso phase is also considered a kind of MCMB. The bulkmeso phase means a condensed MCMB to the extent that optical unisotropic layer thereof is formed into a layer structure, and is usually ground into grain size of not larger than 20 $\mu$m, more preferably, not larger than 10 $\mu$m.

Graphites such as Kish graphite, natural graphite and artificial graphite are used in the invention. The natural graphite includes amorphous graphite and flake graphite. Both graphite and petroleum graphite can be used as artificial graphite, and expansive graphite obtained by the oxidation and thermal decomposition of natural graphite can be used. In effect, any of the conventionally known graphites can be used in the invention, although Kish graphite is most desirable. The amount of graphite used is preferably not more than 15 wt % of the mixture with MCMB, more preferably, 5–10 wt %.

When preparing the mixture, it is preferable to use a binders together. Combining binders is particularly preferable when employing natural or artificial graphite. Generally, any binder useful for carbon materials of this kind can be widely used and, for example, pitch, various thermosetting resins, etc. are preferable binders. The amount of binder used is normally 45-65 wt % with respect to 100 wt % of graphite, more preferably, 30-60 wt %. When using binders together, graphite is normally mixed with binder, then ground. When using Kish graphite and expansive graphite, it is preferable not to use any binder.

When the amount of added graphite is extremely small the effect of the reduction of frictional coefficiency is not sufficiently performed, and therefore a normal amount of addition should not be less than 1 wt %. On the other hand, when amount of addition exceeds 15 wt %, mechanical strength of sintered compact obtained is considerably lowered.

Average grain size of MCMB should not be larger than 20 μm, more preferably, not larger than 10 μm, while grain size of graphite is normally tens to hundreds μm although not definitive.

The raw materials specified above are evenly mixed. The mix method is not restrictive at all and various known mixing methods are available. The obtained mixture is then subject to molding and baking according to customary methods, thus a sintered compact is obtained. When required, the sintered compact is further graphitized. In these steps, various conventional molding, baking and graphitizing means are available.

Figure 16A:
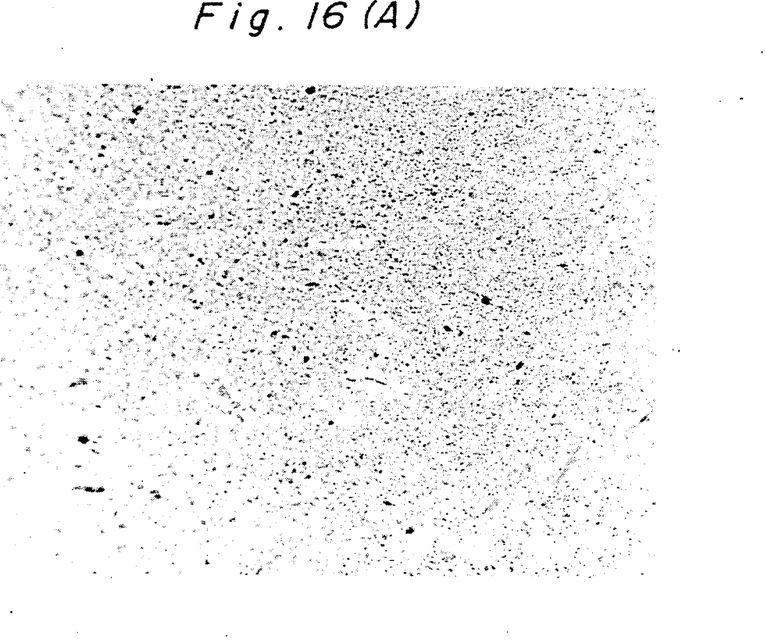
Figure 16B:
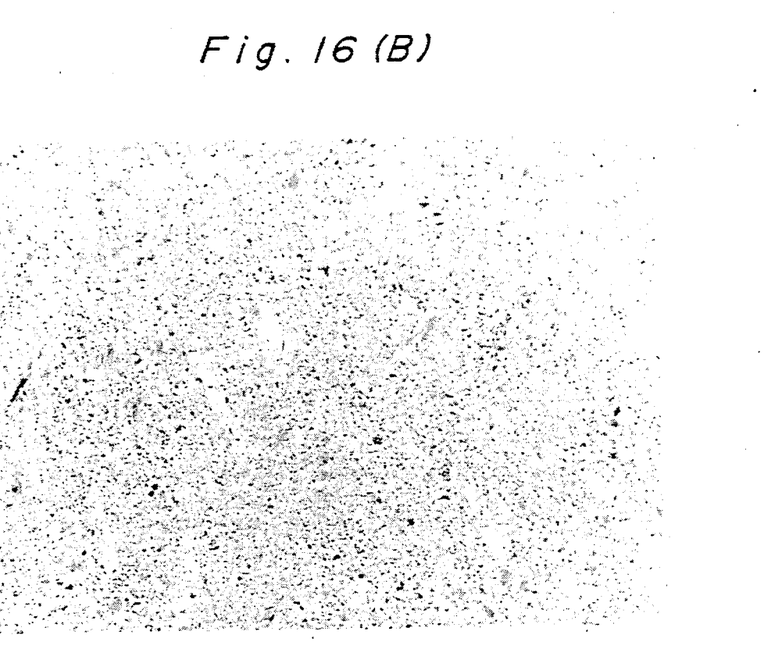

Looking microscopically at the sintered compact according to the invention, it is found that slender graphite layers are almost uniformly distributed in the matrix of MCMB, as schematically shown in FIG. 16 in which numeral (1) indicates the matrix of MCMB and numeral (2) indicates the graphite layer. (A) shows a sintered compact which includes 5 wt % of graphite and (B) shows a sintered compact which includes 10 wt % of graphite.

The sintered compact of the invention is characterized not only by a small friction coefficient but also by mechanical strength and high density substantially equivalent to the conventional MCMB. As a result, the sintered compact can be used not only as fluid sealing member of bearing, mechanical seal, etc. but also as other components including piston rings, guide rings, gland packing (for use in hydraulic turbine or steam turbine), ball joint fittings, rotary joint seals, vanes, ball valve seats, and dies for continuous casting.

DESCRIPTION OF PREFERRED EMBODIMENT

Following Examples 1, 2 and Comparative Examples 1, 2, 3 respectively show specific manufacturing methods of slide contact member of MCMB according to the present invention to be used as a slide contact member with respect to valve disc, and comparisons of physical property between the material obtained in the invention and the known materials.

Example 1

MCMB whose average grain size was 6 μm was molded to have a density not less than 1.30 g/cm$^3$, baked and further graphitized at a high temperature of 2000° C.

Example 2

MCMB was ground into grain size of 6 μm, molded to have a density not less than 1.27 g/cm$^3$, baked and further graphitized at a high temperature of 2500° C.

Comparative Example 1

35 wt % of artificial graphite and 35 wt % of amorphous graphite were mixed with each other, kneaded with phenol resin binder, ground, molded and baked at a temperature of 1500° C.

Comparative Example 2

37 wt % of white metal (Sn 12 wt %, Sb 14 wt %, Cu 1 wt %, Pb 73 wt %) was melted and impregnated by application of pressure into 100 wt % of material obtained in the same manner as Comparative Example 1.

Comparative Example 3

Polytetrafluoroethylene material.

Physical properties of each material obtained in the foregoing examples and comparative examples were measured, the result of which is shown in the following Table 1:

TABLE 1

|  | Example 1 | Example 2 | Comparative Example 1 | Comparative Example 2 | Comparative Example 3 |
| --- | --- | --- | --- | --- | --- |
| Density (g/cm$^3$) | 1.95 | 1.96 | 1.68 | 2.30 | 2.17 |
| Hardness Shore D | 101 | 98 | 62 | 75 | 62 |
| Elastic modulus (kg/mm$^2$) | 1700 | 1500 | 1000 | 1400 | 400 |
| Bending strength (kg/cm$^2$) | 1200 | 1200 | 470 | 750 | 256 |
| Compressive strength (kg/cm$^2$) | 2300 | 2000 | 1450 | 2200 | — |
| Thermal expansion coefficient ($\times 10^{-6}$/°C.) | 6.7 | 5.7 | 3.6 | 4.0 | 110 |
| Charpy impact value (kgcm/cm$^2$) | 5.7 | 5.0 | 1.4 | 2.4 | — |

In the above Table 1, each of physical properties were measured in the following manner:

Bending strength: Each test piece of 10 mm×10 mm×60 mm was placed in such a manner that a distance between fulcrums is 40 mm, radius of curvature between the fulcrums is 1.5 mm, angle of pressure wedge is 60° and radius of curvature of front end thereof is 3 mm. Measurement was carried out by means of universal material tester at a pressure speed of 3 kg/cm$^2$ per second. Each average value per 5 pieces is shown above.

Compressive strength: Each test piece of 10mm×10 mm×10 mm was measured by means of an universal material tester at the pressure speed of 3 kg/cm$^2$ per second. Average value per 5 pieces was shown.

Charpy impact value: Each test piece of 10 mm×10 mm×60 mm was measured at a distance between fulcrums is 40 mm by means of Charpy impact testing machine. Average value per 5 pieces are shown.

Thermal expansion coefficient: Each test piece of 10 mm × 10 mm × 50 mm was measured within a temperature range of 100°–400° C. by means of thermal expansion measuring apparatus.

Example 3

10 wt % of Kish graphite whose average grain size was 60 μm was added to 90 wt % of MCMB whose average grain size was 6 μm, which was then mixed evenly, molded at 1.7 TON/ cm², baked at 900° C. and further graphitized at 2500° C.

Example 4

5 wt % of Kish graphite whose average grain size was 60 μm was added to 95 wt % of MCMB whose average grain size was 6 μm, which was then mixed evenly, molded at 1.5 TON/ cm², baked at 900° C. and further graphitized at 2500° C.

Example 5

68 wt % of flake graphite whose average grain size was 60 μm and 32 wt % of pitch serving as binder are kneaded, then 5 wt % of the kneaded product was evenly mixed with 95 wt % of MCMB whose average grain size was 6 μm, and the mixture was molded at 1.4 TON/ cm², baked at 900° C. and further graphitized at 2500° C.

Example 6

Flake graphite used in above Example 3 was substituted with amorphous graphite whose average grain size was 50 μm.

Example 7

MCMB whose average grain size was 6 μm was molded at 1.5 TON/ cm², baked at 900° C. and further graphitized at 2500° C.

Physical properties of sintered compacts obtained in the foregoing Example 3, 4 and 7 were measured. Following Tables 2 and 3 respectively show the result of measurement, and in which Table 2 shows characteristics of each sintered compact and Table 3 shows result of gas leak test:

TABLE 2

|  | Example 3 | Example 4 | Example 7 |
|---|---|---|---|
| Bulk specific gravity | 1.98 | 2.00 | 1.96 |
| Hardness (Shore D) | 87 | 91 | 98 |
| Resistivity (μ Ω cm) | 1150 | 1200 | 1450 |
| Bending strength (kg/cm²) | 600 | 700 | 1000 |
| Compressive strength (kg/cm²) | 1300 | 1600 | 2000 |
| Elastic modulus (kg/mm²) | 1560 | 1660 | 1500 |

TABLE 3

| Example 3 | No leak |
|---|---|
| Example 4 | No leak |
| Example 7 | No leak |

Measuring methods employed with respect to above Tables 2 and 3 are respectively as follows:

Hardness: measured by means of Shore D type testing machine.

Resistivity: measured by fall-of-potential method.

Bending strength: measured by means of universal tester.

Compressive strength: -ditto-

Gas leak test: visually confirmation by soap water film method when N₂ gas is 5 kg/cm² and thickness is 5 mm.

Figure 17:
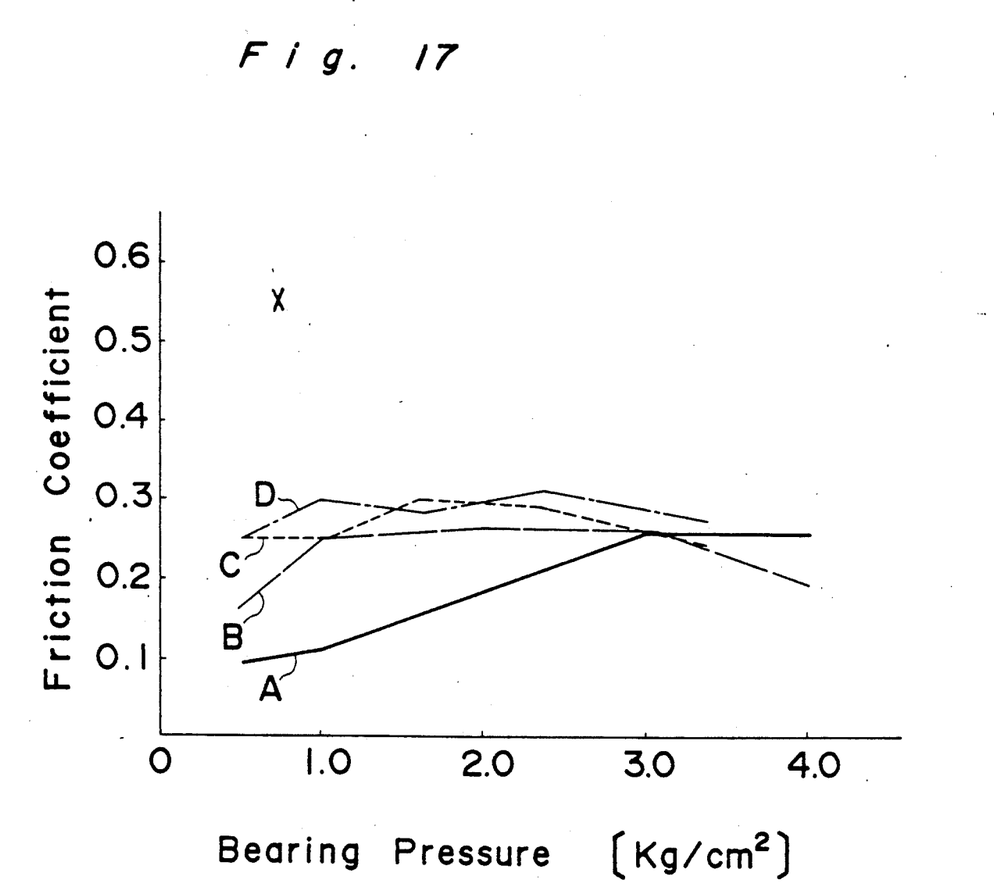
FIG. 17 is a graph showing the relation between bearing pressure and the frictional coefficient of a sintered compact of MCMB and graphite.

Furthermore, Examples 3 to 7 were subject to frictional coefficient tests under the following conditions. FIG. 17 shows result of the test. Frictional coefficient test conditions:

Testing machine : Ring type friction testing machine.

Counter material: φ 90 mm Cr plated ring.

Peripheral speed: 8.2 m/sec

Measuring method of friction coefficient: Input difference method.

Lines in FIG. 17 respectively indicate followings:

A : Example 3
B : Example 4
C : Example 5
D : Example 6

Mark X indicates Example 7.

Examples 8 to 11

In the molding step of Example 3, valve seat, ball joints (two types) and vane were respectively molded, the other steps remaining the same as Example 3.

Each component thus obtained has large mechanical strength, high density and smooth sliding performance.

What is claimed is:

1. A heat resistant fluid sealing member comprising an annular slide contact member of impermeable carbonaceous material which is a sintered compact composed of graphite and mesocarbon microbeads.

2. A heat resistant fluid sealing member according to claim 1 for use in a valve, said annular slide contact member is disposed between a valve casing and a valve disc enclosing a fluid passage to seal fluid and being in contact with said valve disc.

3. A heat resistant fluid sealing member according to claim 2, wherein said graphite is selected from the group consisting of Kish graphite, natural graphite, crystalline graphite, earth graphite and artificial graphite.

4. A heat resistant fluid sealing member according to claim 1, wherein the mesocarbon microbeads have an average grain size of not larger than 10 μm.

5. A heat resistant fluid sealing member according to claim 4, composed of an isotropic graphite material whose anisotropic ratio is not more than 1.10.

6. A heat resistant fluid sealing member according to claim 4, wherein said graphite is selected from the group consisting of Kish graphite, natural graphite, crystalline graphite, earth graphite, artificial graphite and mixtures thereof, said graphite kneaded with a binder, then ground and then mixed with mesocarbon microbeads.

7. A heat resistant fluid sealing member according to claim 1, composed of an isotropic graphite material whose anisotropic ratio is not more than 1.10.

8. A heat resistant fluid sealing member according to claim 1, wherein the sintered compact is a uniform mixture of graphite and not more than 15 wt % of a mesocarbon microbeads.

9. A heat resistant fluid sealing member according to claim 1, wherein said graphite is selected from the group consisting of; Kish graphite, natural graphite, artificial graphite and mixtures thereof.

* * * * *